(12) United States Patent
Blasing et al.

(10) Patent No.: US 6,571,159 B2
(45) Date of Patent: May 27, 2003

(54) METHOD FOR DETERMINING THE ABSOLUTE ANGULAR POSITION OF THE STEERING WHEEL OF MOTOR VEHICLE

(75) Inventors: Frank Blasing, Werl (DE); Christian Schirp, Bochum (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 10/158,621

(22) Filed: May 30, 2002

(65) Prior Publication Data

US 2002/0183909 A1 Dec. 5, 2002

Related U.S. Application Data

(63) Continuation of application No. PCT/EP01/10242, filed on Sep. 6, 2001.

(30) Foreign Application Priority Data

Sep. 30, 2000 (DE) .......................................... 100 48 551

(51) Int. Cl.$^7$ .............................. B62D 15/02; G01D 3/08
(52) U.S. Cl. ........................... 701/41; 701/42; 180/443; 180/444
(58) Field of Search ............................... 701/41, 42, 1; 180/443, 444, 446

(56) References Cited

U.S. PATENT DOCUMENTS

| | | | | |
|---|---|---|---|---|
| 5,180,979 A | * | 1/1993 | Frazzini et al. | 324/207.18 |
| 5,434,784 A | * | 7/1995 | Bradley et al. | 701/41 |
| 6,158,132 A | * | 12/2000 | Kofink et al. | 33/1 PT |
| 6,400,140 B1 | * | 6/2002 | Lee | 324/207.18 |

* cited by examiner

*Primary Examiner*—Tan Q. Nguyen
(74) *Attorney, Agent, or Firm*—Brooks & Kushman, P.C.

(57) ABSTRACT

A method for determining the absolute angular position of a motor vehicle steering wheel includes using a sensor to continually detect first angular measured values of the steering wheel at a constant first interval. A controller outputs encoded output values based on the detected first angle measured values. At high steering wheel rotational speeds the difference between two consecutively measured angular values becomes increasingly greater as a result of the constant measuring rate of the first interval. At such high rotational steering wheel speeds, the method achieves a reliable angular measurement which is verifiable by plausibility considerations by detecting at least one additional second angular measured value of the steering wheel for each output value. The additional second angular measured is detected at a second interval shorter than the first interval and lying between the detection times of successive first angular measured values.

5 Claims, 1 Drawing Sheet

METHOD FOR DETERMINING THE ABSOLUTE ANGULAR POSITION OF THE STEERING WHEEL OF MOTOR VEHICLE

CROSS-REFERENCE TO RELATED APPLICATIONS

This is a continuation of International Application PCT/EP01/10242, published in German, with an international filing date of Sep. 6, 2001.

BACKGROUND OF THE INVENTION

1. Field of the Invention

The invention pertains to a method for determining the absolute angular position of the steering wheel of a motor vehicle. The invention specifically pertains to a method in which a control unit continually reads in first angle measurement values that are physically acquired by a sensor unit associated with the control unit at a constant first interval, wherein the control unit additionally processes and outputs the angle measurement values in the form of coded output values via an output interface.

2. Background Art

The absolute angular position of the steering wheel of a motor vehicle, which is also referred to as the steering angle, is, for example, required for influencing a dynamic control system. In addition to the above-mentioned steering angle, such a dynamic control system receives other measurement data, e.g., the rotational speed of the wheels or the rotation of the motor vehicle about its vertical axis. The absolute steering deflection angle, as well as the steering speed, are evaluated by the dynamic control system together with other acquired data and used for controlling actuators, for example, of the brakes and/or the engine management.

An optoelectronic steering angle sensor for realizing such a method is known from DE 40 22 837 A1. The steering angle sensor described in this document consists of an electronic control unit and a sensor unit with two elements that are arranged parallel to and spaced apart from one another—namely a light source and a line sensor. This steering angle sensor also contains a code disk that is arranged between the light source and the line sensor and connected to the steering spindle without rotational play. In this case, a CCD sensor line is used as the line sensor. The coding of this code disk consists of a light slot that is realized in the form of an Archimedean spiral and extends over 360°. Information on the actual steering angle can be obtained based on the illumination of the corresponding transducer elements of the line sensor at a certain steering deflection. The Archimedean spiral used as the coding extends continuously, i.e., this coding consists of an analog coding. However, this arrangement would also be suitable for reading a digital coding on the code disk, for example, in the form of a Gray code.

The output rate of the measurement values in such a steering angle sensor is generally defined by the dynamic control system of higher order. This means that an angle measurement value is physically acquired by the sensor unit at usually constant intervals (e.g., every 10 msec), additionally processed, and output to the dynamic control system in the form of a coded output value via an output interface.

Due to this fixed output rate, the angle traveled between two measurements increases proportionally with the angular velocity of the steering wheel. However, this significantly limits the reliability of control methods that usually serve for controlling the proper function of such systems and are based on plausibility criteria, specifically because a continuously increasing difference between two successively measured angles must be accepted to be correct as the angular velocity increases.

SUMMARY OF THE INVENTION

Based on the previously discussed state of the art, the invention aims additionally to develop a method of the initially described type in such a way that reliable angle measurement that can be verified by means of plausibility criteria is also possible at high angular velocities of the steering wheel.

According to the invention, this objective is attained due to the fact that at least a second angle measurement value is read in by the control unit for each output value, wherein a second interval that is shorter than the first interval lies between the procedure of reading in the first angle measurement value and the procedure of reading in the second angle measurement value associated with the first angle measurement value.

DETAILED DESCRIPTION OF THE PREFERRED EMBODIMENT(S)

Figure 1:
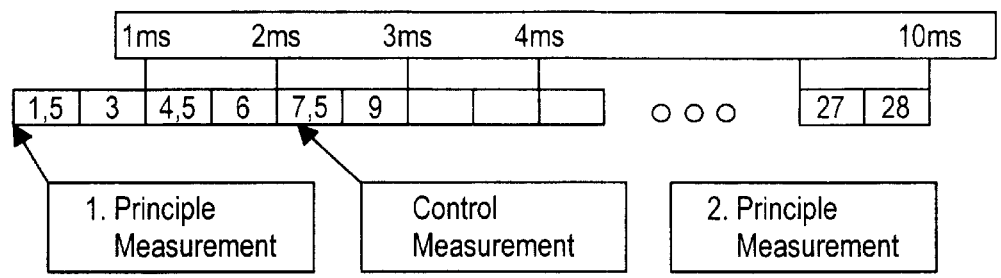
FIG. 1 illustrates the chronological progression of the measurements at the maximum angular velocity.

The embodiment shown is based on a steering angle sensor system that acquires angle measurement values with a resolution of 1.5°, additionally processes the values in a microcontroller, and then outputs coded output values via an output interface in a first interval of 10 msec. The maximum angular velocity of the steering wheel that can be processed by the steering angle sensor system is, for example, 3000°/sec. At the maximum angular velocity, the difference between two successive angle measurements is 30°, as illustrated in FIG. 1 for the discussed embodiment. This means that a functional control method which is based on a plausibility check of successive measurement values must accept all subsequently measured values that lie within the range of ±30° of the first measurement value as correct values.

However, this means that the maximum undetectable measurement error is also ±30° in such a method. This is excessively high for realizing a usable functional control. In order to reduce this value, a second angle measurement value is acquired and read in at a certain time that lies within the first interval of 10 msec. In this case, the respective measurement values that are read in first are treated as so-called principal measurement values that, after being additionally processed and subjected to a plausibility check, are output to a dynamic control system in coded form. In this case, the plausibility check consists of an inquiry as to whether the difference between the current principal measurement value and the principal measurement value that was acquired last and that forms the basis for the previously-output output value exceeds a predetermined first maximum value or not. If the maximum value is not exceeded, the current principal measurement value is accepted as correct and is output in coded form.

However, if the maximum value is exceeded, it is checked as to whether this excessive difference may be caused by a high angular velocity or not, based on the control measurement value measured after the preceding principal measurement value. The differential angle is also determined in this case, specifically in the form of the difference between the control measurement value measured last and the corresponding principal measurement value, i.e., the principal measurement value that forms the basis for the previously-output output value. If this second difference represents an intermediate value that corresponds to the first difference to be checked, specifically by taking into consideration the shorter interval between the principal angle measurement and the control angle measurement, and if this second difference does not exceed a predetermined second maximum value, the current principal measurement value is accepted as correct and is output.

If this is not the case, however, it can be assumed that a faulty measurement was performed and a corresponding error message is output instead of the output value. Due to the shorter interval between the principal angle measurement that is also referred to as the principal measurement and the control angle measurement that is also referred to as the control measurement, by comparison to the interval between two principal measurements, this second maximum value can be significantly lower than the first maximum value of 30°. This means that the error probability is reduced.

The determination of the optimal length of this second interval that lies between a principal measurement and the corresponding control measurement is based on the following considerations: the time of the control measurement should, in principle, lie as close as possible to the corresponding principal measurement because the angle traveled between the two angle measurements that at the same time signifies the second maximum value decreases proportionally with the time difference at the maximum angular velocity.

However, the reduction of the interval is limited because it needs to be ensured that, beginning at the (limiting) angular velocity at which the principal measurement is subject to an angular error greater than a still-acceptable error, a differential angle was traveled between the principal measurement and the corresponding control measurement that at least corresponds to the resolution of the measuring system in order to obtain definitive information at all.

In this case, the values for the maximum angular velocity $\omega_{max}$, the resolution $\alpha$, the first interval T (between two principal measurements), the second interval t (between the principal measurement and the corresponding control measurement) and the described limiting angular velocity $\omega_g$ are correlated as shown below:

$$\omega_{max}*t=\omega_g*T => \omega_g=\omega_{max}*t/T$$

$$\omega_g=\alpha/t$$

Figure 2:
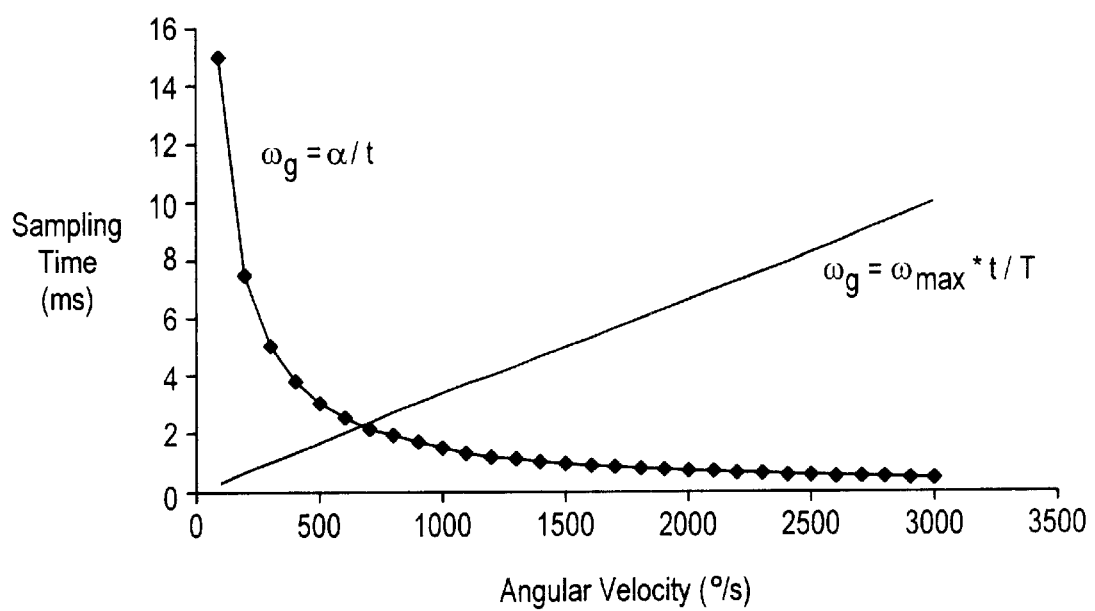
FIG. 2 illustrates a diagram for optimizing the intervals between a "principal" measurement and a "control" measurement.

These two functional correlations between $\omega_g$ and t are also illustrated in the diagram according to FIG. 2 with the values mentioned in the above-described embodiment. The optimal value for the limiting angular velocity $\omega_g$ is achieved if both conditions are fulfilled, i.e., at the intersection point of the two curves. In this case, the following applies:

$$\omega_g=\pm(\alpha*\omega_{max}/T)^{1/2}$$

wherein the following values result for T=10 msec:

$$\omega_g=\pm 670°/sec \text{ and } t=2.236 \text{ msec.}$$

This means that the optimal interval between a principal measurement and the corresponding control measurement is 2.236 msec in this embodiment. Consequently, the maximum undetectable error occurring at the maximum angular velocity is reduced from 30° to 6.7°.

If a lower value is chosen for the interval between a principal measurement and the corresponding control measurement, the maximum undetectable error increases because the values of the principal measurement and the control measurement can only be differentiated beginning at a higher angular velocity. For example, if t=2 msec, then $\omega_g=\pm 750°/sec$, i.e., the maximum undetectable error is 7.5°.

If a higher value is chosen for the interval between a principal measurement and the corresponding control measurement, the maximum undetectable error increases because a greater angle is traveled between the principal measurement and the control measurement at the maximum angular velocity. For example, if t=3 msec, an angle of 9° is traveled between the principal measurement and the control measurement. This means that a difference of less than 9° cannot be detected as an error.

The latter instance is, however, not as critical because the previously described check as to whether the second difference represents an intermediate value that corresponds to the first difference (between two principal measurements) to be checked, specifically by taking into consideration the shorter interval between the principal measurement and the control measurement, already provides quite reliable results even if the differential angle between the principal measurement and the control measurement is this high. This statement is generally based on the idea that changes in the angular velocity cannot take place so abruptly that a violation of this criterion would be consistent with the normal motional dynamics of the steering wheel due to its inertia of mass. Consequently, it is highly probable that a violation of this "continuity criterion" indicates a faulty measurement.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for determining an angular position of a steering wheel, the method comprising:

sensing the angular position of the steering wheel at a first instant of time and generating a first principal value indicative of the sensed angular position of the steering wheel at the first instant of time;

sensing the angular position of the steering wheel at a second instant of time and generating a second principal value indicative of the sensed angular position of the steering wheel at the second instant of time, wherein a first time interval separates the first and second instants of time;

sensing the angular position of the steering wheel at a third instant of time and generating a first control value indicative of the sensed angular position of the steering wheel at the third instant of time, wherein the third instant of time lies between the first and second instants of time such that a second time interval that is shorter in duration than the first time interval separates the first and third instants of time;

calculating the difference between the second and first principal values;

accepting the second principal value as being the angular position of the steering wheel at the second instant of time if the difference between the second and first principal values is less than a first limit; and if the difference between the second and first principal values is greater than the first limit, then calculating the difference between the first control value and the first principal value;

accepting the second principal value as being the angular position of the steering wheel at the second instant of time if the difference between the first control value and the first principal value is less than a second limit; and rejecting the second principal value as being the angular position of the steering wheel at the second instant of time if the difference between the first control value and the first principal value is more than the second limit.

2. The method of claim 1 wherein:

the second time interval is determined in dependence on at least one of the duration of the first time interval, a maximum permissible angular velocity of the steering wheel, and sensing resolution.

3. The method of claim 1 wherein:

the duration of the second time interval is determined in dependence on the duration of the first time interval.

4. The method of claim 1 wherein:

the duration of the second time interval is determined in dependence on a maximum permissible angular velocity of the steering wheel.

5. The method of claim 1 wherein:

the duration of the second time interval is determined in dependence on sensing resolution.

* * * * *